United States Patent [19]

Reiker

[11] Patent Number: 4,463,923
[45] Date of Patent: Aug. 7, 1984

[54] HANGER ASSEMBLY

[76] Inventor: Kenneth H. Reiker, 22 Lake Shore Dr., Shalimar, Fla. 32579

[21] Appl. No.: 401,138

[22] Filed: Jul. 23, 1982

[51] Int. Cl.³ .......................................... F16M 13/00
[52] U.S. Cl. .................................. 248/546; 248/27.1; 248/57; 248/DIG. 6
[58] Field of Search .................... 248/57, 217.2, 27.1, 248/544, 546, 231.2, DIG. 6; 52/39, 678

[56] References Cited

U.S. PATENT DOCUMENTS

| | | | |
|---|---|---|---|
| 2,140,861 | 12/1938 | Steketee | 248/27.1 |
| 2,670,919 | 3/1954 | Esoldi | 248/57 X |
| 2,713,983 | 7/1955 | Kay | 248/57 |
| 2,770,436 | 11/1956 | Linhardt, Jr. | 248/57 |
| 2,964,279 | 12/1960 | Galloway | 248/57 X |
| 3,214,126 | 10/1965 | Roos | 248/57 X |
| 3,518,421 | 6/1970 | Cogdill | 248/57 |
| 4,122,762 | 10/1978 | Williams | 52/39 X |
| 4,391,428 | 7/1983 | Grimes | 248/57 X |

Primary Examiner—J. Franklin Foss
Assistant Examiner—David L. Talbott
Attorney, Agent, or Firm—Shlesinger, Arkwright, Garvey & Fado

[57] ABSTRACT

A heavy duty expansible junction box hanger assembly adapted for installation from beneath a ceiling through a junction-box aperture in the ceiling without complete prior removal of a previously installed light-weight hanger assembly. The portion of the light-weight hanger directly above the aperture is cut away, and the heavy duty hanger is maneuvered through the aperture to a position above the light-weight hanger. A pair of feet on each end of the heavy duty hanger straddle the light-weight hanger and rest on the upper ceiling surface, aligning the heavy duty hanger parallel to the ceiling, after which joist engagement means on the hanger assembly are expanded into biting contact with the joists.

12 Claims, 3 Drawing Figures

HANGER ASSEMBLY

The invention relates to the art of hanger assemblies for suspending heavy objects such as ceiling fans, and more particularly to such assemblies which are adapted for installation through a junction-box aperture in a ceiling without complete prior removal of a previously installed light-weight hanger assembly, and without the necessity for entry into the attic.

Numerous hanger assembly designs are known for installation of comparatively light chandeliers, light fixtures, or the like. These typically are installed from above the ceiling during construction of the building, and are quite satisfactory under these conditions. They are however not sufficiently rigid and sturdy to support a considerably heavier load, particularly a load which exerts torque and vibrations, such as a ceiling fan.

The problem therefore arises of how to properly support such a heavier load when access to the space above the ceiling is not readily available. This problem is rendered more acute when a light-weight hanger assembly has been previously installed above the desired location, since removal of the light-weight assembly through an existing ceiling junction-box aperture would be quite difficult.

These and other difficulties with prior art hanger assemblies are avoided by the present invention, as described below.

According to a first major aspect of the invention, there is provided an expansible junction-box hanger assembly adapted for installation from beneath a ceiling through a junction-box aperture in the ceiling without complete prior removal of a previously installed light-weight hanger assembly, the expansible hanger assembly comprising first and second engagement means actuable for engaging and biting into respective first and second ceiling joists disposed above and on opposite sides of the aperture, the combination therewith of first and second alignment means for supporting the respective first and second engagement means independently of contact with the light-weight hanger assembly prior to actuation of the engagement means. According to another aspect of the invention, the alignment means comprises foot means for resting on the upper surface of the ceiling. According to another aspect of the invention, the alignment means comprises a pair of depending foot means for resting on the upper surface of the ceiling on opposite sides of the light-weight hanger assembly. According to another aspect of the invention, the expansible hanger assembly further comprises means defining a threaded bore extending along an axis from a first end toward a second end of a brace member; a rod having a first threaded end received within and mating with the bore and having a second end; means for mounting the first alignment means on the brace member for rotation about the axis relative to the brace member; and means for rigidly mounting the second alignment means on the rod. According to another aspect of the invention, the first engagement means is rigidly mounted on the first alignment means, and the second engagement means is rigidly mounted on the second alignment means. According to another aspect of the invention, the expansible hanger assembly further comprises means for expanding the assembly from a length of no greater than 14½ inches to a length greater than 22½ inches.

According to a second major aspect of the invention, there is provided an expansible junction-box hanger assembly adapted for installation from beneath a ceiling through a junction-box aperture in the ceiling without prior complete removal of a previously installed light-weight hanger assembly, the expansible hanger assembly comprising an elongated brace member having first and second end portions, the brace member comprising means defining a bore extending along an axis from the first end portion toward the second end portion, at least a portion of the bore being threaded, and a non-round outer peripheral surface adapted for engagement by a wrench whereby the brace member may be rotated about the axis; a rod having a first threaded end received within and mating with the threaded portion of the bore and having a second end; first engagement means for engaging and biting into a first ceiling joist extending above and on a first side of the aperture; means for mounting the first engagement means on the second end of the brace member for rotation about the axis; second engagement means for engaging and biting into a second ceiling joist extending parallel to the first ceiling joist above and on the side of the aperture opposite the first side of the aperture; means for rigidly mounting the second engagement means on the second end of the rod; and alignment means for supporting the brace member and the rod substantially parallel to the plane of the ceiling and substantially perpendicular to the joists and above the light-weight hanger assembly. According to another aspect of the invention, the dimensions of the brace member, the bore, the rod, and the first and second engagement members are selected such that the expansible hanger assembly has an adjustable maximum dimension in a direction parallel to the axis at least as small as 14½ inches when the rod is fully received within the bore and greater than 22½ inches while the rod is still received within the bore. According to another aspect of the invention, the non-round peripheral surface comprises a plurality of planar portions extending substantially parallel to the axis over a region from 7.25 inches to 11.25 inches from the distal end of the first engagement means. According to another aspect of the invention, the expansible junction-box hanger further comprises clamp means for mounting a junction box having a substantially planar upper surface parallel to the axis and parallel to and in contact with one of the planar portions.

Other aspects will in part appear hereinafter and will in part be apparent from the following detailed description taken in connection with the accompanying drawings, wherein.

Figure 1:
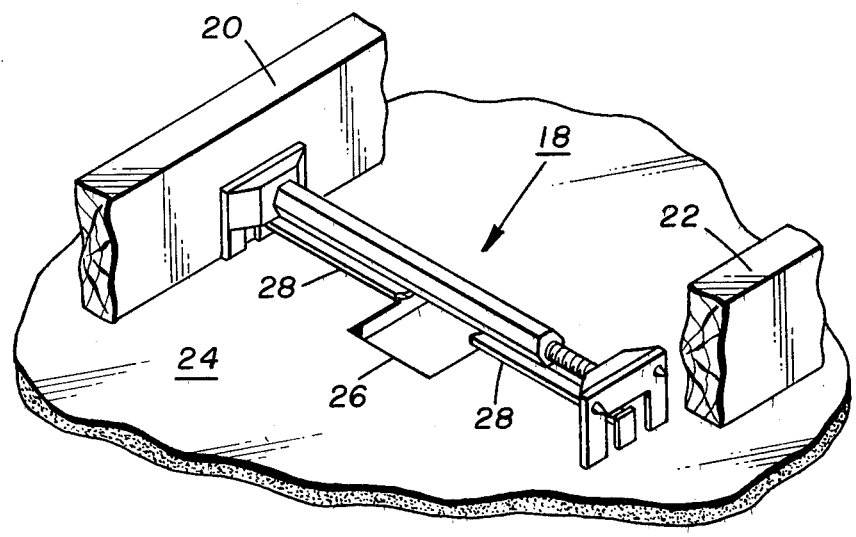
FIG. 1 is a perspective view of the major components of the preferred hanger assembly of the invention installed, as viewed from above the ceiling.

As shown in FIG. 1, the hanger assembly 18 of the invention is installed between parallel horizontal joists 20 and 22, the latter being broken away in the drawing in the vicinity of the hanger assembly for purposes of illustration. Ceiling 24 is supported by the lower surfaces of joists 20 and 22, and is penetrated by junction-box aperture 26, the latter affording access from the room below. The center portion of a previously installed light-weight hanger assembly has been removed, as by sawing away with a hacksaw approximately even with the edges of aperture 26, leaving stub portions 28 installed.

Figure 2:
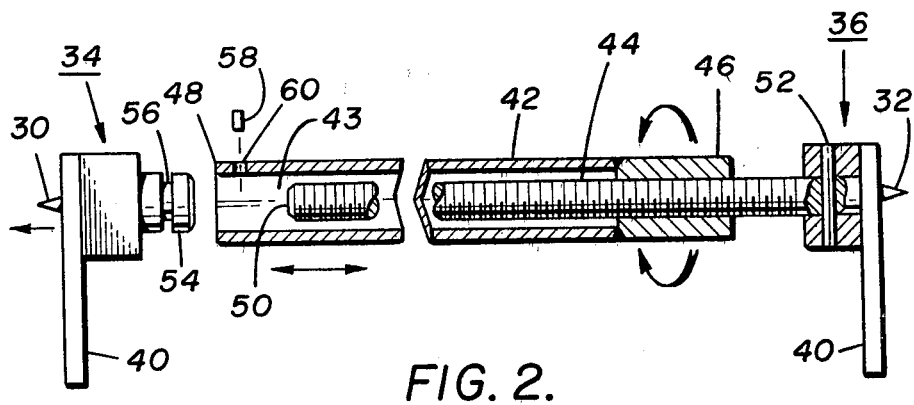
FIG. 2 is a side elevation view of the FIG. 1 assembly partially in section and partially exploded.

With reference to FIGS. 1 and 2, hanger assembly 18 comprises first and second engagement means 30 and 32 respectively, each of which is preferably in the form of a plurality of points for engaging and biting into the respective joists when actuated. Engagement means 30 are rigidly attached to alignment means 34 for supporting engagement means 30 independently of contact with leftmost stub portion 28 as viewed in FIG. 1, while engagement means 32 are rigidly attached to alignment means 36 for supporting engagement means 32 independently of contact with rightmost stub portion 28 as viewed in FIG. 1. Each of alignment means 34 and 36 preferably comprises a pair of depending feet 40 straddling the respective stub portions 28 and resting on the upper surface of ceiling 24 on opposite sides of the respective stub portions 28.

Figure 3:
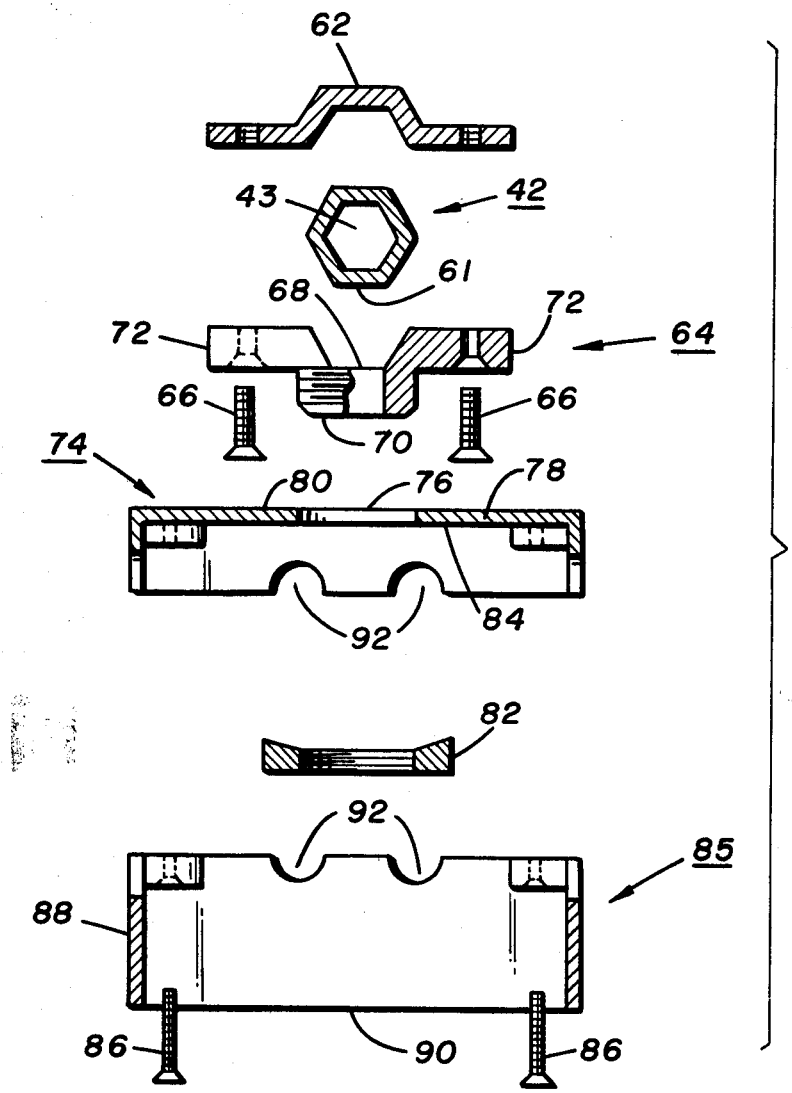
FIG. 3 is an exploded vertical sectional view, including those further elements constituting the complete preferred embodiment of the invention.

Hanger assembly 18 further comprises elongated brace member 42 and rod 44, which together cooperate as means for actuating engagement means 30 and 32. Brace member 42 has a bore 43 extending along an axis from its first end portion 46 toward its second end portion 48, the bore being internally threaded at end portion 46. The outer peripheral surface of brace member 42 is nonround, the specifically preferred configuration being hexagonal (note FIG. 3). Rod 44 has a first threaded end 50 received within and mating with the threaded portion of bore 43.

The second or opposite end of rod 44 is rigidly mounted on alignment means 36, as by illustrated pin 52. Alignment means 34 is mounted for rotation about the axis of bore 43. As viewed in FIG. 2, a generally right circularly cylindrical protrusion 54 is rigidly attached to the right side of alignment means 34 and is received within the left end of bore 43. An annular groove 56 is formed on protrusion 54. Pin 58 is pressed through aperture 60 in the wall of brace 42 and protrudes into groove 56, thus preventing movement of alignment means 34 axially with respect to the axis of brace 42 while permitting relative rotation of brace 42 and alignment means 34 about the axis of bore 43.

The preferred embodiment of the invention as thus described is installed as follows. With rod 44 rotated so as to be received within bore 43 to the maximum extent, the maximum dimension of the hanger assembly (measured from the tips of engagement means 30 to the tips of engagement means 32) is preferably at least as small as 14½ inches, and most preferably at least as small as 14¼ inches. Hanger assembly 18 is maneuvered through aperture 26 until feet 40 on alignment means 34 straddle the leftmost stub portion 28 as viewed in FIG. 1 and rest on ceiling 24, while feet 40 on alignment means 36 straddle the rightmost stub portion 28 and also rest on ceiling 24. As thus arranged, alignment means 34 and 36 support brace 42 and rod 44 substantially parallel to the plane of ceiling 24 and substantially perpendicular to joists 20 and 22, ready for axial expansion of engagement means 30 and 32 into biting contact with the joists. Brace 42 is then rotated, as by engagement with a wrench, expanding engagement means 30 and 32 into biting contact with the joists, during which time the several feet 40 maintain brace 42 and rod 44 substantially parallel to the plane of ceiling 24.

When the major components of hanger assembly 18 are tightly expanded between joists 20 and 22, rotation of brace 42 is stopped with one of the planar portions 60 of its outer periphery parallel to the plane of ceiling 24 and the preferred remainder of the assembly (FIG. 3) is installed through aperture 26. Upper and lower brackets 62 and 64 have their opposed surfaces formed so as to be complementary to the non-round outer peripheral surface of brace 42, and are tightly secured to brace 42 by screws 66. Lower bracket 64 comprises a planar surface region 68 mating with surface 60 on brace 42, and a threaded neck 70 depending from lower surface 72, the latter being substantially coplanar with surface 68. Upper box portion 74 has an aperture 76 through its upper wall 78 for receiving neck 70, and has a planar upper surface 80. A locking nut 82 is screwed on neck 70 and tightened against lower surface 84 of wall 78, bringing upper surface 80 into contact with surfaces 68 and 60 for the full width of box portion 74 in the direction parallel to the axis of brace 42. This provides substantially increased rigidity of the assembly with minimum materials as compared to prior art designs wherein only a portion of the upper box surface contacts a bracing member. Finally, lower box portion 84 is attached to upper box portion 74 by screws 86. The height of vertical side walls 88 of box portion 84 are selected in conjunction with the length of feet 40 so that the lower edge 90 of box portion 84 will be substantially flush with the lower surface of ceiling 26. Finally, recessed portions 92 are formed in opposed edges of the side walls of box portions 74 and 84, for introduction of wiring from the attic into the box prior to final installation of box portion 84.

What is claimed is:

1. An expansible load-bearing junction box hanger assembly adapted for installation from beneath the ceiling and through a junction box aperture in the ceiling without requiring complete removal of the previously installed light-weight hanger assembly over which it is installed comprising:
    (a) a pair of spaced joist engaging means for interengaging two spaced adjoining ceiling joists in a sustained high-pressure load-bearing engagement to support a heavy vertical load,
    (b) elongated linearly expanding brace means which is aligned with and connected between the joist engaging means for readily expanding from a short to a longer length to bring each of the joist engaging means into forced pressure contact with their respective joist surfaces for all points along its length of expansion through an outward force substantially greater than the operative force applied thereto and for providing a strong non-flexing space with high vertical load-bearing capability,
    (c) a support means connected to each of the joist engaging means which rests on and rides along the upper surface of the ceiling for supporting the interconnecting brace means above and in parallel alignment clear of the non-removed end portions of the previously installed light-weight hanger assembly during and after final expansion of the brace means and for also providing vertical load bearing capability,
    (d) a junction box supported on the central section of the expansible brace means, and
    (e) junction box connecting means rigidly connected to the brace means for firmly and rigidly connecting the junction box in solid engagement with the brace assembly and for providing a two axis twist-resistant mechanical connection for supporting a heavy rotatable unit electrically powered through the junction box.

2. The expansible load-bearing junction box hanger assembly as set forth in claim 1, wherein:
(a) the brace means includes a tubular member having an enlarged central bore rotatably mounted on one of the joist engaging means at its one end and a fixed threaded rod of smaller diameter than the bore which is freely telescopically receivable therein from the other end from the tubular member,
(b) the tubular member being rotatably connected to one of the joist engaging means at its outer end, and having a short threaded bore at its inner end,
(c) the threaded rod at its outer end being in fixed non-rotative engagement with the other joist engaging means and with its inner end section being in threaded engagement with the threaded bore of the tubular member.

3. The expansible load-bearing junction box hanger assembly as set forth in claim 2, wherein:
(a) the rotatable mounting between the outer end of the tubular member and the one joist engaging element includes a heavy-duty cylindrical protrusion integrally connected to the inner surface of the adjacent joist engaging means which extends inwardly in bearing engagement with the enlarged central bore of the tubular member at its outer end, and
(b) fastening means for holding the protrusion and the tubular rod in a freely movable mechanically rotatable connection.

4. The expansible load-bearing junction box hanger assembly as set forth in claim 2, wherein:
(a) tubular member has a length substantially greater than the mid distance between the joists and has a plurality of flat sides which are manually graspable, and
(b) a rotatable coupling constituting the rotatable connection between the one end of the tubular member for providing a freely movable coupling free of interference from the effect of the interengagement between the joist and the joist engaging means.

5. The expansible load-bearing junction box hanger assembly as set forth in claim 1, wherein:
(a) the support means includes two depending feet which are sufficiently laterally spaced from each other and of sufficient length to provide supportive clearance from the previously installed lightweight hanger assembly elements fastened to the joists.

6. The expansible load-bearing junction box hanger assembly as set forth in claim 1, wherein:
(a) the junction box has side walls which have electrical cable receiving openings, and
(b) the box has a removable lower portion which has an upper periphery which forms part of the periphery of the cable receiving openings.

7. An expansible load-bearing junction box hanger assembly adapted for installation from beneath the ceiling and through a junction box aperture in the ceiling without requiring complete removal of the previously installed lightweight hanger assembly over which it is installed comprising:
(a) a pair of spaced joist engaging means for interengaging two spaced adjoining ceiling joists in a sustained high-pressure load-bearing engagement to support a heavy vertical load,
(b) an elongated linearly expansible brace rotatably connected at its outer end to one of the joist engaging means and having a length greater than the mid distance between the spaced joists, the central interior portion thereof having a longitudinal bore,
(c) an elongated rod aligned with and receivable in the bore which has its outer end rigidly connected to the other joist engaging means,
(d) both the brace and the rod being strong inflexible members connected to their respective joist engaging means through heavy load bearing structure,
(e) thread means for interconnecting the brace and rod with an interacting element on each for providing a rotative mechanically advantageous means for providing strong outward expansive force,
(f) the rotative connection of the brace including a heavy duty circular bearing surface integral with the one joist engaging means and a circular matching bearing surface at the outer end of the brace which both interengage in a bearing element which is free from interference and binding action from the joist surface when the hanger assembly reaches its final outward position,
(g) a support means connected to each of the joist engaging means which rests on and rides along the upper surface of the ceiling for supporting the interconnecting brace means above and in parallel alignment clear of the non-removed end portions of the previously installed light-weight hanger assembly during and after final expansion of the brace and rod, and for also providing vertical load bearing capability,
(h) a junction box supported on the brace, and
(i) junction box connecting means rigidly connected to the brace for firmly and rigidly connecting it in solid engagement to the brace and for supporting a heavy load.

8. The expansible load bearing junction box hanger assembly as set forth in claim 7, wherein:
(a) the support means connected to the joist engaging means includes a spaced pair of downwardly extending legs rigidly connected to each of the spaced joist engaging means which are of sufficient length to hold the hanger assembly at its required height.

9. The expansible load bearing junction box hanger assembly as set forth in claim 7, wherein:
(a) the rotatable coupling includes an inwardly extending cylindrical protrusion containing one bearing surface, the bearing surface at the outer end of the brace is an internal surface within the brace member.

10. The expansible load bearing junction box hanger assembly as set forth in claim 7, wherein:
(a) the junction box has side walls which have electrical cable receiving openings, and
(b) the box has a removable lower portion which has an upper periphery which forms part of the periphery of the cable receiving openings.

11. An expansible load-bearing junction box hanger assembly adapted for installation from beneath the ceiling and through a junction box aperture in the ceiling without requiring complete removal of the previously installed lightweight hanger assembly over which it is installed comprising:

(a) a pair of spaced joist engaging means for interengaging two spaced adjoining ceiling joists in a sustained highpressure load-bearing engagement to support a heavy vertical load, (b) elongated linearly expanding brace means which is aligned with and connected between the joist engaging means for readily expanding from a short to a longer length to bring each of the joist engaging means into forced pressure contact with their respective joist surface for all points along its length of expansion through an outward force substantially greater than the operative force applied thereto and for providing a strong non-flexing span with high vertical load-bearing capability, (c) a support means connected to each of the joist engaging means which rests on and rides along the upper surface of the ceiling for supporting the interconnecting brace means above and in parallel alignment clear of the non-removed end portions of the previously installed light-weight hanger assembly during and after final expansion of the brace means and for also providing vertical load bearing capability, (d) the junction box has side walls which have electrical cable receiving openings, and (e) the box has a removable lower portion which has an upper periphery which forms part of the periphery of the cable receiving openings.

12. The expansible load bearing junction box hanger assembly as set forth in claim 11, wherein:

(a) the brace means includes a tubular member having an enlarged central bore rotatably mounted on one of the joist engaging means at its one end and a fixed threaded rod of smaller diameter than the bore which is freely telescopically receivable therein from the other end of the tubular member, (b) the tubular member being rotatably connected to one of the joist engaging means at its outer end, and having a short threaded bore at its inner end, and (c) the threaded rod at its outer end being in fixed non-rotative engagement with the other joist engaging means and with its inner end section being in threaded engagement with the threaded bore of the tubular member.

* * * * *